(12) United States Patent
Riju et al.

(10) Patent No.: US 11,921,495 B2
(45) Date of Patent: Mar. 5, 2024

(54) SYSTEM AND A METHOD FOR ASSET MONITORING IN AN INDUSTRIAL PLANT

(71) Applicant: ABB Schweiz AG, Baden (CH)

(72) Inventors: Varghese Riju, Bangalore (IN); Milind Bhangale, Bangalore (IN); Vivek Nair, Bangalore (IN); Anders Trosten, Västerås (SE)

(73) Assignee: ABB Schweiz AG, Baden (CH)

( * ) Notice: Subject to any disclaimer, the term of this patent is extended or adjusted under 35 U.S.C. 154(b) by 354 days.

(21) Appl. No.: 17/296,290

(22) PCT Filed: Nov. 26, 2019

(86) PCT No.: PCT/IB2019/060156
§ 371 (c)(1),
(2) Date: May 24, 2021

(87) PCT Pub. No.: WO2020/109987
PCT Pub. Date: May 4, 2020

(65) Prior Publication Data
US 2022/0100175 A1 Mar. 31, 2022

(30) Foreign Application Priority Data
Nov. 26, 2018 (IN) .............................. 201841044517

(51) Int. Cl.
*G05B 19/418* (2006.01)
*G05B 19/042* (2006.01)

(52) U.S. Cl.
CPC ..... *G05B 19/4185* (2013.01); *G05B 19/0426* (2013.01); *G05B 19/4183* (2013.01); *G05B 19/41885* (2013.01)

(58) Field of Classification Search
CPC ............ G05B 19/4185; G05B 19/0426; G05B 19/4183; G05B 19/41885;
(Continued)

(56) References Cited

U.S. PATENT DOCUMENTS 5,812,394 A 9/1998 Lewis et al.
9,047,165 B1 6/2015 Mosterman
(Continued)

OTHER PUBLICATIONS

European Patent Office, International Search Report for PCT/IB2019/060156, dated Apr. 17, 2020, 4 pages.
(Continued)

*Primary Examiner* — Christopher E. Everett
(74) *Attorney, Agent, or Firm* — Leydig, Voit & Mayer, Ltd.

(57) ABSTRACT

A method (500), performed by an industrial automation system, for condition monitoring an industrial plant includes receiving (502) operational data of die industrial plant and obtaining an information model corresponding to at least one asset of the industrial plant from a cloud infrastructure. The method (500) further includes processing (504) die operational data using the information model to generate a recommendation for a control action. The industrial automation system (200) is configured to provide a means to update the information model by dynamically receiving (510) a new scheme for condition monitoring from a user and generating (512) an updated information model based on the received scheme using an engineering tool m the cloud infrastructure. The step of updating the information model is performed by storing the updated information model in a machine readable file format on the cloud infrastructure.

16 Claims, 5 Drawing Sheets

(58) Field of Classification Search
CPC .......... G05B 2219/32369; G05B 17/02; Y02P 90/02; Y02P 90/80
See application file for complete search history.

(56) References Cited

U.S. PATENT DOCUMENTS

| | | | | |
|---|---|---|---|---|
| 2004/0199925 | A1* | 10/2004 | Nixon | G05B 19/4188 |
| | | | | 719/315 |
| 2007/0035321 | A1 | 2/2007 | Gorodetsky et al. | |
| 2007/0132779 | A1* | 6/2007 | Gilbert | G06T 13/00 |
| | | | | 345/619 |
| 2008/0049013 | A1 | 2/2008 | Nasle | |
| 2008/0052384 | A1* | 2/2008 | Marl | H04L 12/2807 |
| | | | | 709/224 |
| 2009/0327942 | A1* | 12/2009 | Eldridge | G06F 8/34 |
| | | | | 715/771 |
| 2012/0029661 | A1* | 2/2012 | Jones | G06F 3/0484 |
| | | | | 700/17 |
| 2014/0337086 | A1* | 11/2014 | Asenjo | G06F 3/0635 |
| | | | | 705/7.28 |
| 2017/0098022 | A1 | 4/2017 | Kephart et al. | |
| 2017/0192414 | A1 | 7/2017 | Mukkamala et al. | |
| 2018/0006913 | A1* | 1/2018 | Asenjo | H04L 41/0856 |
| 2019/0102360 | A1* | 4/2019 | SayyarRodsari | G05B 23/0221 |

OTHER PUBLICATIONS

European Patent Office, Written Opinion for PCT/IB2019/060156, dated Apr. 17, 2020, 9 pages.
Indian Patent Office, First Examination Report for related IN 201841044517, dated Mar. 31, 2021, 7 pages.

* cited by examiner

SYSTEM AND A METHOD FOR ASSET MONITORING IN AN INDUSTRIAL PLANT

CROSS-REFERENCE TO RELATED APPLICATIONS

This application is a U.S. national stage of International Application Serial No. PCT/IB2019/060156, filed Nov. 26, 2019, which claims priority to Indian Patent Application No. 201841044517, filed Nov. 26, 2018. The entire disclosures of both of the foregoing applications are incorporated herein by reference.

BACKGROUND

Embodiments of the present invention relate generally to an industrial automation system, more particularly to a system for condition monitoring of an industrial asset in an industrial system using dynamically updated information models.

Assets in an industrial plant include equipment such as, but not limited to, machines, network switches, motors, pumps, and valves. Typically, sensors are deployed in the plant and are used for monitoring of assets and process control operations. It is well known that efficient monitoring of plant equipment helps in reducing the plant down time and increase the plant efficiency. Generally, the asset monitors are built specifically for each asset at the time of manufacturing or commissioning of the plant. Configuring of monitoring actions needs domain knowledge and understanding of operational requirements. Typically, monitoring of plant equipment involves determination of monitoring parameters using equipment models and specifying functions operating on the equipment parameters which typically needs modeling of equipments, generation of information models and computer programming.

However, efficient operation of the plant requires changes in monitoring requirements. Even for a small change in monitoring functionality, a new asset monitor needs to be developed and deployed at the customer site. This can become quite difficult when there is huge number of assets. In some cases, the asset monitors need to be modified according the infrastructure difference or in the way the assets are used. Some asset monitoring can be specific and only an asset vendor can provide the monitoring logic. Typically, plant monitoring is performed by a domain expert at the location of the site and the change requirements are generated by the domain expert. Distribution of specialized asset monitors to different customers at frequent intervals can be difficult.

Domain experts assigned with the task of monitoring the plant may prefer to experiment with multiple monitoring schemes before selecting an optimum one. However, they may lack programming expertise and depend on others for devising the schemes. Accordingly, there is a need for a configurable asset monitoring system and method which is able to address the issues discussed above.

BRIEF DESCRIPTION

In accordance with one aspect of the invention, a method for condition monitoring an industrial plant having a plurality of assets is disclosed. The method is performed by an industrial automation system deployed in the industrial plant. The method includes receiving operational data of the industrial plant. The operational data includes data corresponding to the plurality of assets. The method includes obtaining an information model corresponding to the at least one asset from the plurality of assets of the industrial plant from a cloud infrastructure accessible by the industrial automation system. The information model is representative of a dynamically updated scheme for condition monitoring of the at least one asset. The information model includes condition monitoring logic for evaluating the states and condition of the at least one asset using one or more operational parameters associated with the received operational data. The method further includes processing the operational data using the information model to generate a recommendation for a control action. The control action includes at least one of a storing of the recommended action on the cloud infrastructure, modifying at least one operational parameter, and presenting the recommended control action on a human-machine interface (HMI). The industrial automation system is configured to provide a means to update the information model by dynamically receiving a new scheme for condition monitoring from a user formulated using one or more graphical block. Further, the information model is updated by generating an updated information model based on the received scheme for condition monitoring using an engineering tool in the cloud infrastructure. Also, the information model is updated by storing the updated information model in a machine readable file format on the cloud infrastructure.

In accordance with another aspect of the present invention, an industrial automation system for monitoring an industrial plant having a plurality of assets is disclosed. The industrial automation system includes a data acquisition unit configured to receive operational data of the industrial plant. The operational data comprises data corresponding to the plurality of assets. The industrial automation system further includes a database unit communicatively coupled to the data acquisition unit and configured to store the operational data. The industrial automation system also includes an authoring unit communicatively coupled to the database unit and configured to generate an information model by dynamically receiving a scheme for condition monitoring from a user formulated using one or more graphical block. Further, the authoring unit is configured to generate an information model based on the received scheme for condition monitoring using an engineering tool in the cloud infrastructure. The information model is representative of a dynamically updated scheme for condition monitoring of the at least one asset. The information model includes condition monitoring logic for evaluating the states and condition of the at least one asset using one or more operational parameters associated with the received operational data. The authoring unit is also configured to store the information model in a machine readable file format on the cloud infrastructure. The industrial automation system further includes a condition monitoring unit communicatively coupled to the authoring unit and the cloud infrastructure and configured to process the operational data using the information model to generate a recommendation for a control action. The control action includes at least one of a storing of the recommended action on the cloud infrastructure, modifying at least one operational parameter, and presenting the recommended control action on a human-machine interface.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Figure 1:
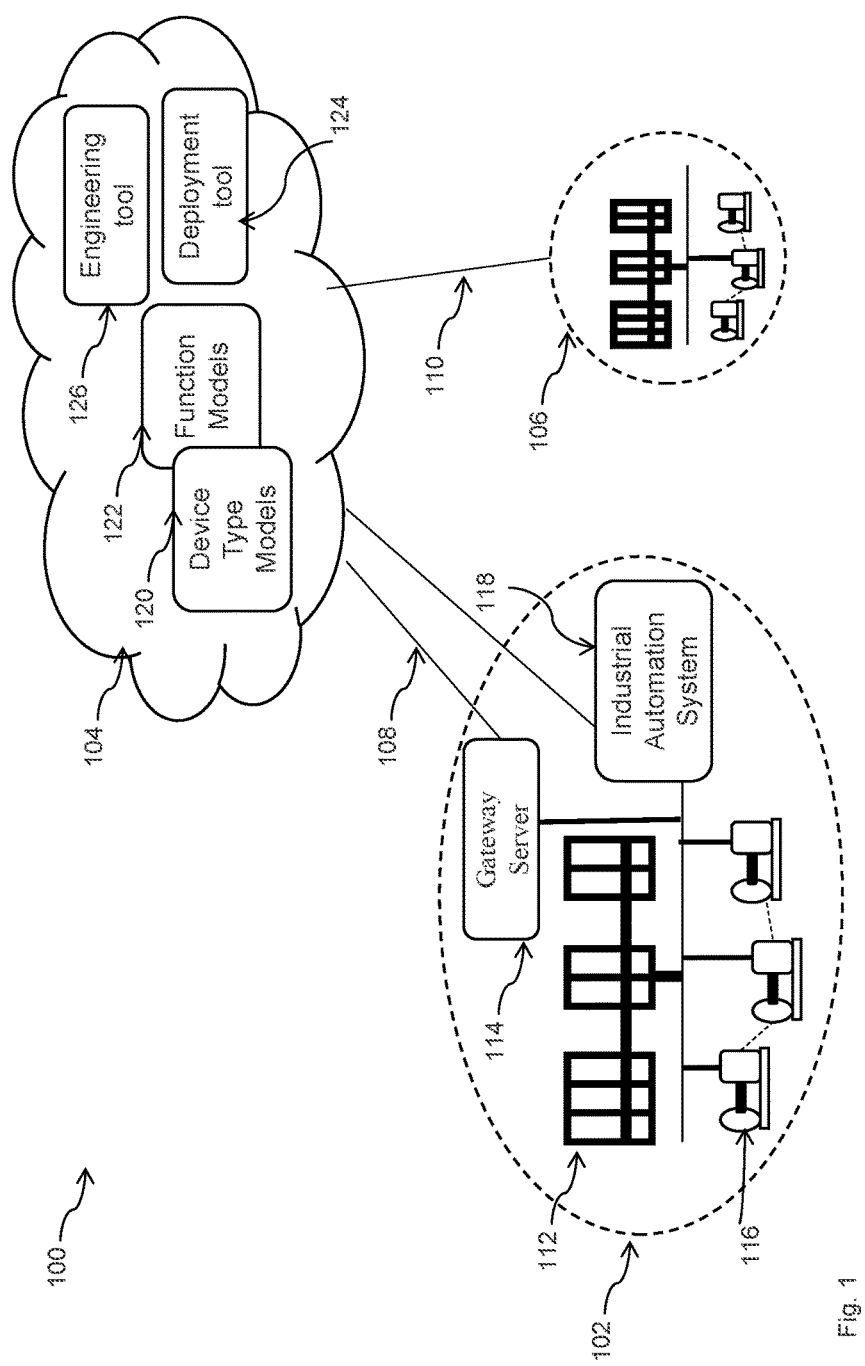
FIG. 1 is a diagrammatic illustration of a industrial plant having an industrial automation system in accordance with an exemplary embodiment.

As will be described in detail hereinafter, techniques for monitoring an industrial asset are presented. Specifically, the embodiments presented herein relate to a system and a method for configuring models for condition monitoring of equipment in the industrial system.

The phrase 'industrial plant' refers to an infrastructure for manufacturing of goods, processing raw materials or power generation. The phrase 'industrial automation system' refers to a system used for monitoring and control the industrial plant in an automated manner. The phrase 'condition monitoring' refers to monitoring and analyzing state of an asset or a subsystem of the industrial plant for at least one of a fault detection and preventive maintenance. The term 'asset' refers to a machine, a subsystem or an equipment used in the industrial plant. The phrase 'operational data' refers to data generated by or data related to the assets of the industrial plant. The phrase 'information model' refers to a definition of a processing step, a representation of an asset, or specification of a monitoring scheme for one or more assets of the industrial plant. Specifically, the information model may be in the form of a combination of a plurality of asset models and functions over the operational data. The information model is represented by a block diagram with specific parameters of the operational data as inputs. The information model also includes a processing block having multiple asset models interconnected in accordance with a specific design. The processing block also includes multiple function models used for processing input parameters and intermediate parameters. The information model also specifies one more output variables that are useful in monitoring and control of the industrial plant. The input parameters may be one or more parameters from the operational data. The term 'gateway' refers to a communication server deployed in the industrial plant and configured to interface with external computational or storage facilities including cloud infrastructure. The term 'gateway' and the phrase 'EDGE server' are used equivalently and interchangeably in the present specification. The term 'condition monitoring unit' is used herein to refer to a processing element equipped with software required to process the information model for the purpose of monitoring the industrial plant. The term 'EDGE' is an abbreviation for 'enhanced data GSM environment' and represents wireless communication protocol supporting higher data rates. The term 'authoring' refers to the process of defining functions and specifying interconnections between various asset models for realizing an intended monitoring and control functionality. The phrase 'authoring tool' refers to a software and a graphical user interface hosted in a server of the industrial plant and configured to access an engineering tool hosted in the cloud for creating an information model. The authoring tool is also configured to deploy the information model in the industrial plant by accessing a deployment tool hosted in the cloud storage for initiating monitoring of the industrial plant. The phrase 'cloud infrastructure' refers to a remote hosted infrastructure involving storage facility for maintaining databases, storing data and software. The cloud infrastructure is configured to provide computational services, software services and storage facilities through servers hosted in the cloud.

In accordance with an embodiment of the present invention, an industrial automation system is configured to perform condition monitoring of an industrial plant having a plurality of assets. The industrial automation system is generally configured to automate the operations of the industrial plant. In the present invention, the industrial automation system is configured to use dynamically updated information model for condition monitoring of assets of the industrial plant. The industrial automation system includes a data acquisition unit configured to receive operational data of the industrial plant. The operational data includes data corresponding to the plurality of assets. The industrial automation system includes a database unit communicatively coupled to the data acquisition unit and configured to store the operational data. The industrial automation system further includes an authoring unit communicatively coupled to the database unit and configured to enable an operator to author an information model. Specifically, the authoring unit is configured to access an engineering tool hosted on the cloud storage for creating the information model. The authoring unit is configured to dynamically receive a new scheme for condition monitoring from a user. The phrase 'dynamically receiving' specifically means that the new scheme is provided by the user at any point of time after the commissioning of the industrial plant and/or industrial automation system. Dynamically generating the information model includes generating a new information model corresponding to the new scheme by the engineering tool and storing the new information model on the cloud infrastructure. The authoring unit is further configured to access a deployment tool hosted on the cloud storage for initiating downloading of the information model on the industrial automation system and its subsequent use for condition monitoring of the industrial plant. The ability of the industrial automation system to use dynamically generated information model for new way of condition monitoring is referred herein as dynamic deployment of the information model.

In one embodiment, the authoring unit is configured to create a function model. Specifically, the authoring unit includes a graphical user interface configured to enable a user to specify an input, an output, a logical rule and a end-point for generating a function model. The input represents one or more parameters of the operational data, the output represents a monitoring variable or an intermediate variable determined based on the input. The logical rule is a combination of rules or an algorithm for determining the output from the input. The end-point provides a relative location of the function to be accessed by a processing element performing condition monitoring operations. The authoring unit is further configured to transfer the function model specified by the user to the engineering tool. The engineering tool is configured to include the function model to a library of function models. It may be noted that the library of function model is available to the authorized users of multiple industrial plants accessible via the internet.

In a further embodiment, the authoring unit is configured to create a device type model such as, but not limited to, an electrical machine, a mechanical device or an electromechanical equipment. The authoring unit is configured to access the engineering tool and facilitates storing the device type model in a library of device type models. The library of device type models is accessible to multiple authorized users across multiple industrial plants.

Further, the authoring unit is configured to create an information model based on one or more of the function models of the library of function models and one or more device type models from the library of device type models. Specifically, the authoring unit is configured to display the library of functions and the library of device type models on the graphical user interface of the authoring tool. The graphical user interface is configured to provide options for the user to select one or more of device type models. In one embodiment, the selection of device type models may be performed via drag and drop action. In other embodiments, the selection of device type models may be performed by other actions such as, but not limited to, a double click action and highlighting action. Similarly, the graphical user interface is also configured to provide options for the user to select one or more function models. Further, the graphical user interface is also configured to provide interconnections between the one or more device type models and the one or more function models to complete construction of an information model. The authoring tool is also configured to store the authored information model on the cloud storage using the engineering tool.

In one embodiment, the authoring tool is also configured to enable a user to include a custom module to the cloud storage. The custom module may be a machine learning algorithm or an artificial intelligence algorithm implemented in a programming language such as python and provided with remote procedure call routines. Further, the authoring tool is also configured to enable a user to create a function description for the custom module by specifying an input, an output and an end-point. The function description is stored as an information model along with an association with the corresponding custom model.

In a further embodiment, the authoring tool is also configured to initiate deployment of the information model for monitoring the industrial plant using a deployment tool. The deployment is configured to transfer the information model from the cloud storage to the industrial automation system of the industrial plant. If the information model to be deployed for monitoring the industrial plant corresponds to a custom module, the authoring tool is also configured to initiate transfer of the custom module to the industrial automation system of the industrial plant.

The industrial automation system also includes a condition monitoring unit communicatively coupled to the authoring unit and configured to perform monitoring of industrial plant. Specifically, the condition monitoring unit performs the monitoring of the industrial plant using the information model. When the monitoring of the industrial plant is to be performed using the custom module, the condition monitoring unit executes the custom module in the container form using the corresponding information model. The condition monitoring unit generate one or more monitoring variables based on the operational data and the information model during the monitoring. The condition monitoring unit is further configured to generate a recommendation based on the monitoring variables. Further, the condition monitoring unit is also configured to transfer the monitoring variables and the recommendations to the cloud storage for storing and later usage. In one embodiment, the monitoring variables and the recommendations are accessible from the cloud storage via the internet. The recommendation may also be used by users for preventive maintenance of at least one asset in the industrial plant. The condition monitoring unit is also configured to provide the recommendation to a human-machine interface.

It may be noted herein that the industrial automation system is configured to dynamically generate at least one of a function model, an asset model and an information model based on user inputs and deploy them subsequently for condition monitoring of one or more assets of the industrial plant.

FIG. 1 is a diagrammatic illustration of an industrial system 100 having an industrial automation system for monitoring the industrial plant in accordance with an exemplary embodiment. The industrial system 100 supports a plurality of industrial plants 102 operated with an industrial automation system, 106. Each of the industrial plants such as 102 includes a plurality of equipment 116 and plant communication network 112, servers eg a gateway server 114 etc. For representation purpose, an industrial automation system 118 is shown separately as a block but a person skilled in the art would recognize that the industrial automation system comprises field devices (eg sensors connected to industrial assets), controllers, servers, client stations for engineering & operator work stations, along with plant communication network devices for connecting various devices (field devices, controllers, servers etc). The plant communication network 112 and the gateway server 114 are configured to implement the automation for the equipment 116. Further, the industrial automation system 118 is configured to perform condition monitoring activities for the plant. The industrial automation system 118 is configured to process operational data acquired from the equipment 116 and generate monitoring parameters usable for generating recommendations.

In one embodiment, the industrial automation system 118 includes computational and storage resources required to perform the monitoring activities. In an alternate embodiments, the computational and storage resources may be shared across multiple industrial plants 102, 106 by leveraging a cloud infrastructure. The computational requirements for the condition monitoring is obtained from the cloud as a software as service (SaS). The storage requirements for the condition monitoring is obtained by using storage capabilities of the cloud infrastructure.

In the illustrate embodiment, the industrial plants 102, 106 are communicatively coupled to a cloud infrastructure 104. The cloud infrastructure 104 in one embodiment includes an engineering tool 126, and a deployment tool 124. The engineering tool 126 includes software modules capable of generating at least one of a function model, a device type model and an information model. The function model is representative of a logical operation performed on a specified input to generate a pre-determined output. A device type model is a representation of a device, equipment or a subsystem that may be used for monitoring and/or prediction purposes. The information model includes a scheme for monitoring a specific aspect of the industrial plant.

In the embodiments of the present specification, the industrial automation system 118 is configured to use the engineering tool 126 for creating a new function model, a new device type model and a new information model.

Specifically, the industrial automation system 118 is configured to access the engineering tool 126 and enable the user to specify details of at least one of the function model, the device type model and the information model. Further, the industrial automation system 118 is also configured to direct the engineering tool 126 to store the function model, the device type model and the information model in the cloud storage. In general, the cloud infrastructure 104 stores a plurality of device type models 120, a plurality of function models 122 and a plurality of information models.

In one embodiment, the industrial automation system 118 is configured to transmit the operational data to the cloud infrastructure and receive the recommendations required for preventive maintenance of the equipment 116. In an alternate embodiment, the industrial automation system 118 is configured to receive an information model from the cloud infrastructure and process the operational data from the equipment 116 to generate recommendations. Further, the industrial automation system 118 is configured to transfer the recommendations to the cloud infrastructure for storage and retrieval from other users and locations. It may be noted that software services and data hosted on the cloud infrastructure may be accessed by users within the plant either via the gateway or via the internet communication channel.

Figure 2:
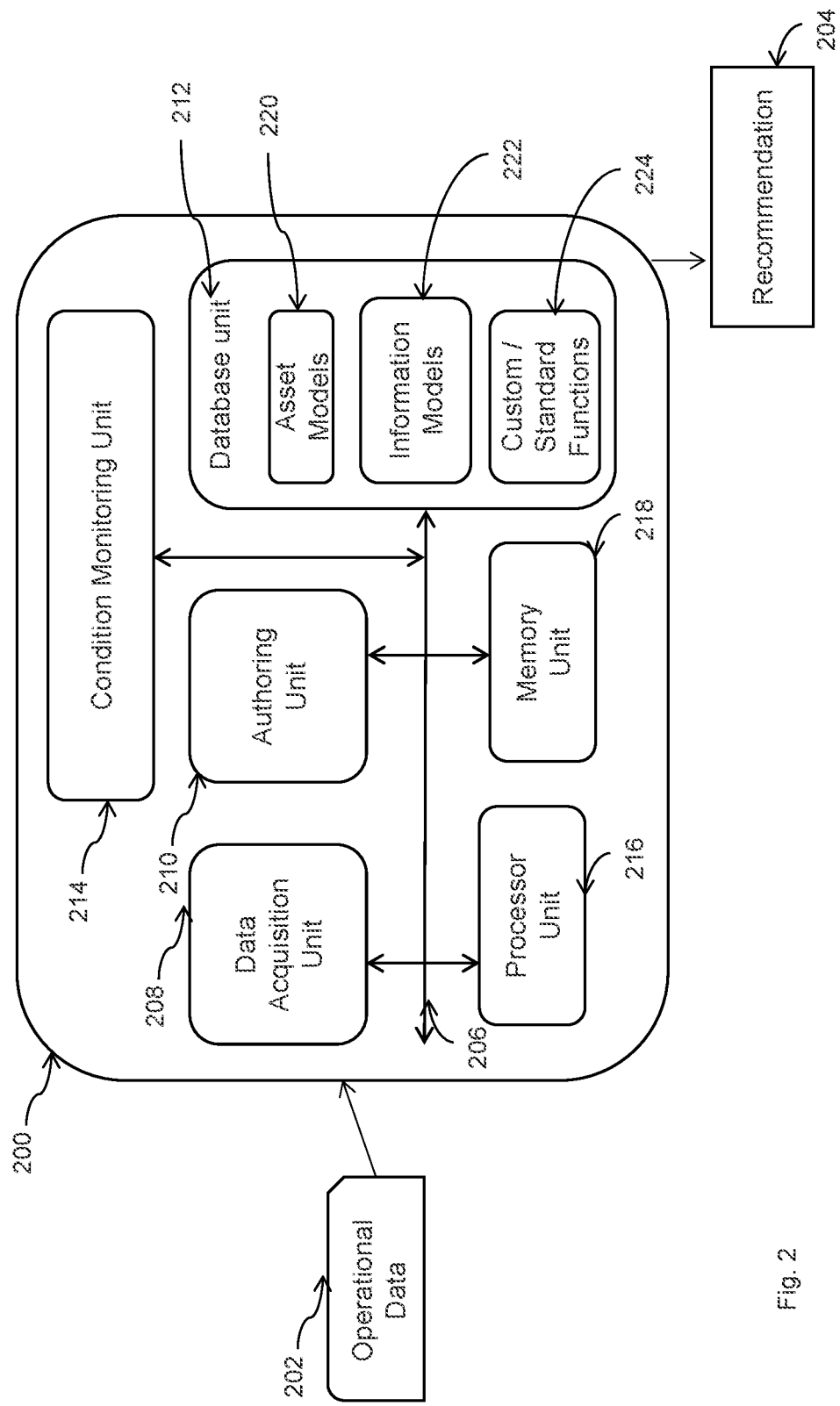
FIG. 2 is a block diagram illustrating the industrial automation system having a condition monitoring unit in accordance with an exemplary embodiment.

FIG. 2 is a block diagram illustrating the industrial automation system 200 for monitoring the industrial plant in accordance with an exemplary embodiment. The industrial automation system 200 includes a data acquisition unit 208 (eg sensors/field devices), an authoring unit 210, a database unit 212, a condition monitoring unit 214, a processor unit 216, and a memory unit 218. The database unit 212 further includes asset models 220, information models 222, and custom functions 224. The industrial automation system 200 further includes a communications bus 206 configured to establish communication between the plurality of units 208, 210, 212, 214, 216, 218. Operation data (202) is separately shown as a block to depict one or more data relating to the plant asset are being collected by the industrial automation system (200). Similarly, a block, 204, for recommendation is provided to depict condition related recommendations made by the industrial automation system in one or more HMI of the industrial automation system (eg operator station) and also HMI connected with the industrial automation system (eg operator's mobile phone or other hand held devices).

The data acquisition unit 208 is communicatively coupled to various sensors, data sources and users and configured to receive operational data generated within the industrial plant, and user data provided by a user. The data acquisition unit 208 is also configured to receive other types of data such as, but not limited to, installation data corresponding to the industrial plant and nameplate data corresponding to equipment of the industrial plant. The data acquisition unit 208 may include circuitry for acquiring data from sensors and pre-processing acquired data for noise reduction and data conditioning purposes.

The authoring unit 210 is communicatively coupled to at least one of a gateway server of the industrial plant or internet and configured to access the cloud infrastructure. In one embodiment, the authoring unit 210 is provided with a user input device, a display device and a graphical user interface to enable a user to build at least one of a function model, a device type model and an information model in the form of a block diagram. In one embodiment, the authoring unit 210 is configured to use the engineering tool 126 of FIG. 1 to create the information model in a suitable definition language based on the block diagram representation. In a further embodiment, the authoring unit 210 is configured to use the engineering tool 126 to store the information model in the cloud infrastructure and grant access permissions to other users. In another embodiment, the authoring unit 210 is configured to use the deployment tool 124 to download the information model to a memory unit in the industrial plant or initiate usage of information model for condition monitoring of the industrial plant.

The database unit 212 is communicatively coupled to the authoring unit 210 and configured to store a library of function models, a library of device type models and a library of information models. The database unit 212 may also include operational data and other data acquired by the data acquisition unit 208. The database unit 212 may be extension of the memory unit 218 and designed to provide specialized data structures and file formats that are useful in managing large amounts of data. In one embodiment, the database may be a structure query language (SQL) based database. In an alternate embodiment, the database may be no-SQL based technology such as MongoDB and other Bigdata databases.

The condition monitoring unit 214 is communicatively coupled to the database unit 212 and configured to perform monitoring of the industrial plant based on the information model and the operational data. In one embodiment, the condition monitoring unit 214 is configured to interpret the information model and perform the monitoring actions. Further, the condition monitoring unit 214 is also configured to receive a custom module in a container form and execute the custom module to perform the monitoring actions. Further, the condition monitoring unit 214 is configured to generate monitoring parameters based on the operational data while performing monitoring actions specified in the information model. The condition monitoring unit 214 is further configured to generate recommendations based on the monitoring parameters. In one embodiment, the condition monitoring unit is configured to initiate preventive maintenance actions based on the recommendations. Further, the condition monitoring unit 214 is also configured to transfer the monitoring parameters and the recommendations to the cloud infrastructure. Finally, the condition monitoring unit 214 is also configured to provide the monitoring parameters as well as the recommendations to a human-machine interface (HMI).

The processor unit 216 includes one or more processing elements co-located within the industrial automation system 200 or distributed in the plant at one or more servers and the gateway. In some embodiments, the processing element may be a micro-controller, a general processor unit, or a digital signal processing unit. In further embodiments, the processor unit 216 may be a parallel processor, a custom made hardware such as field programmable gate arrays (FPGA) and application specific integrated circuits (ASIC). In specific embodiments, the processor unit 216 may include a plurality of processing element one in each of the units 208, 210, 212, 214 configured to perform functionality of respective units.

The memory unit 218 includes one or more storage modules assembled using one or more type of memory. As an example, one memory module of the memory unit 218 may be a random access memory (RAM). Similarly, one or more memory modules of the memory unit 218 may be read only memory (ROM), a programmable ROM (PROM), an erasable PROM (EPROM), and an electrically erasable PROM (EEPROM). In one embodiment, the memory unit 218 may be configured to create a database such as the one illustrated by numeral 212 for storing large amount of data and software required to implement multiple units 208, 210, 212, 214.

Figure 3:
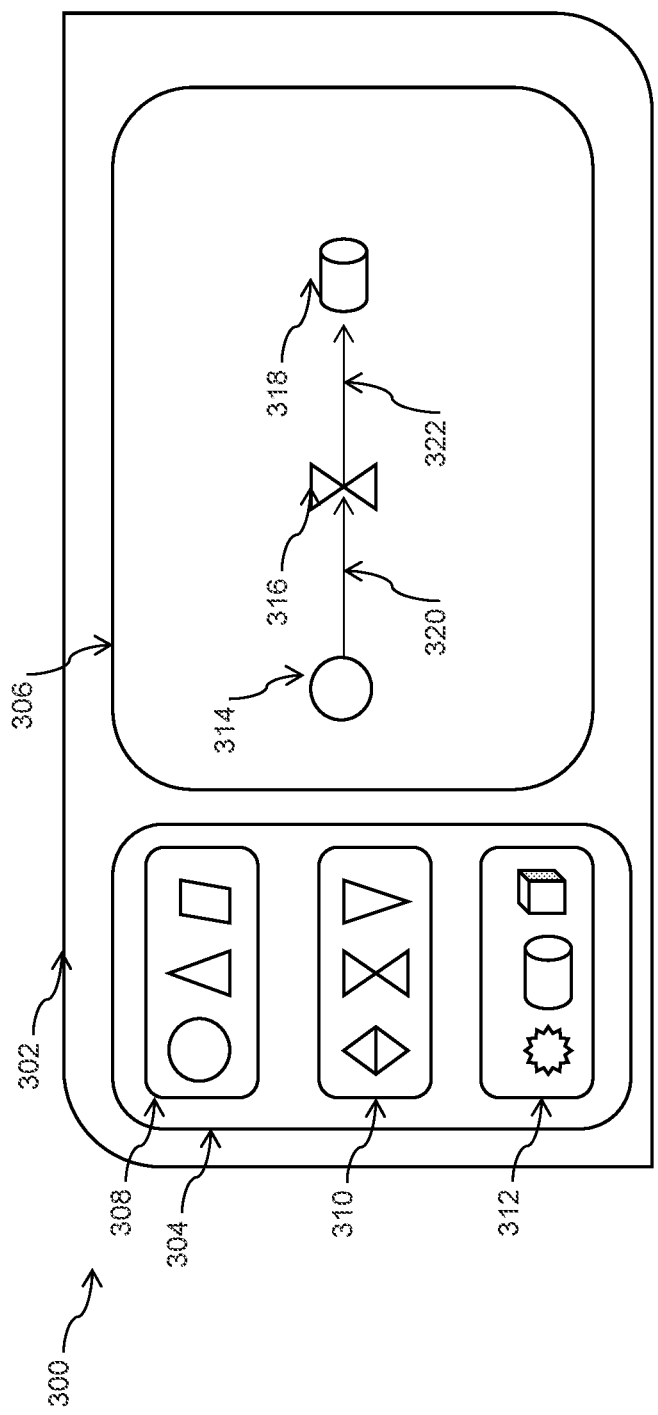
FIG. 3 is a diagrammatic illustration of a user interface for configuring asset monitoring models in accordance with an exemplary embodiment.

FIG. 3 is a diagrammatic illustration of a graphical user interface 300 of the authoring tool used for configuring information models in accordance with an exemplary embodiment. The graphical user interface 300 includes a display screen 302 with a first portion 304 showing library repository, and a second portion 306 illustrating the information model under creation. The library repository includes a library of input parameters 308, a library of function models 310 and a library of device type models 312. The second portion 306 illustrates an example of creating an information model having a plurality of elements 314, 316, 318 selected from the library repository 304. The example information model further includes a plurality of interconnections 320, 322 among the plurality of selected elements 314, 316, 318. The plurality of interconnections 320, 322 are provided by an user of the graphical user interface 300 to complete the information model.

Figure 4:
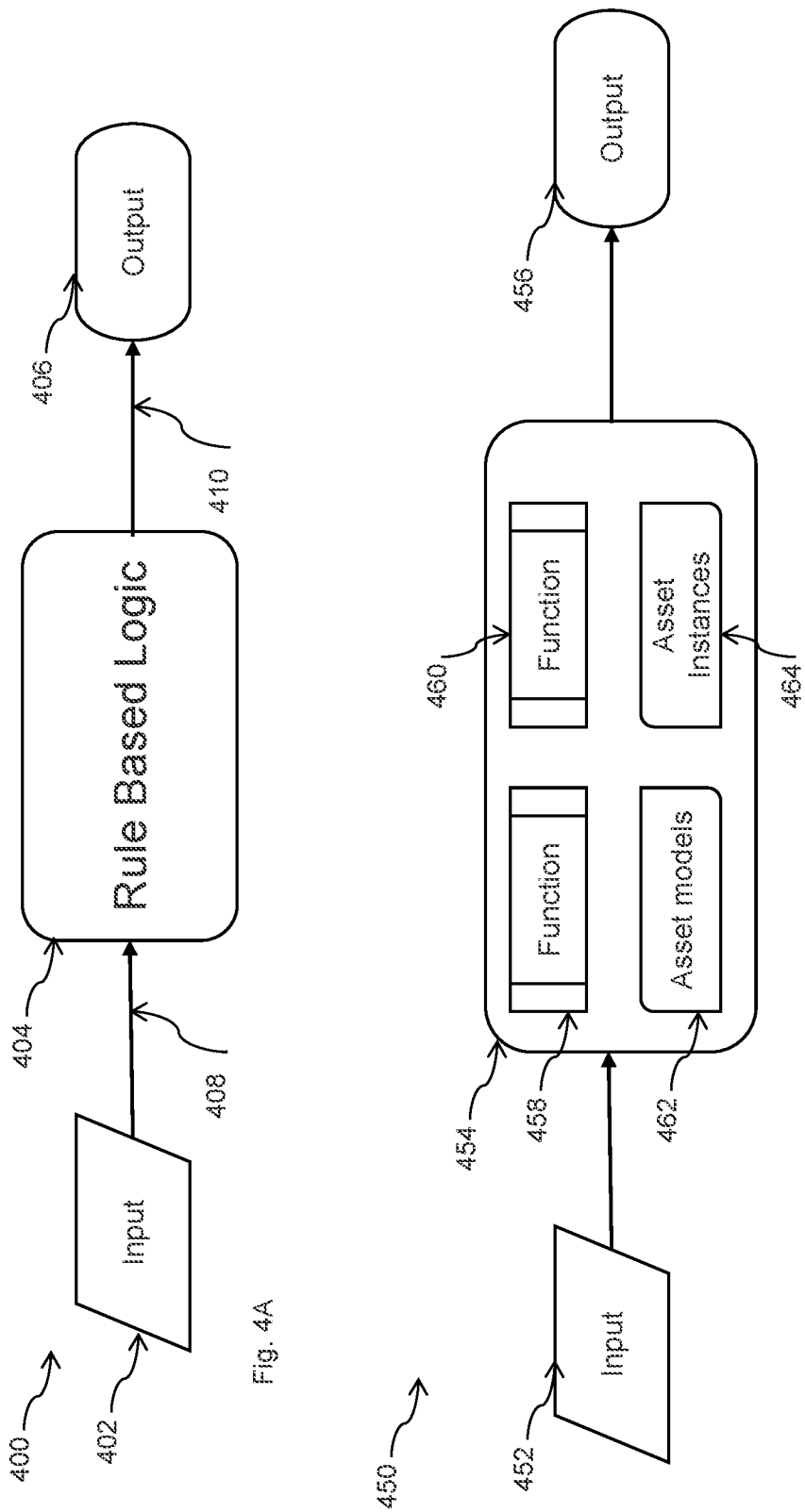
FIG. 4A is a schematic illustrating a function model in accordance with an exemplary embodiment.
FIG. 4B is a schematic illustrating a condition monitoring model in accordance with an exemplary embodiment.

FIG. 4A is a schematic illustrating a function model 400 in accordance with an exemplary embodiment. The function model 400 includes an input 402 representative of one or more parameters from the operational data. The function model also includes a rule based logic 404 configured by a user for processing the input 402 for monitoring the industrial plant. The function model 400 further includes an output 406 representative of a derived parameter. The function model 400 also includes a plurality of interconnectors 408, 410 specified by the user. It may be noted that the input parameter 402, the rule based logic 404 and the output parameter 406 are all selected from a library and the interconnectors 408, 410 are specified by a user based on domain knowledge without the need for any programming skill.

FIG. 4B is a schematic illustrating a information model 450 in accordance with an exemplary embodiment. As stated previously, the information model 450 is representative of a condition monitoring scheme usable for performing condition monitoring of the industrial plant. The information model is specified by selecting the function models 458, 460, asset models 462 and asset instance 464. In addition, the information model is specified by providing one or more interconnections among the asset models 462, function models 458, 460 and the asset instances 464. Further, the information model is specified by providing an input 452 and an output 456. In a specific example, the output 436 may be representative of a recommendation for preventive maintenance of the industrial plant. It may be noted herein that a user who has domain knowledge but not familiar with programming may easily create the information model 450 using actions such as drag and drop and highlighting operations.

Figure 5:
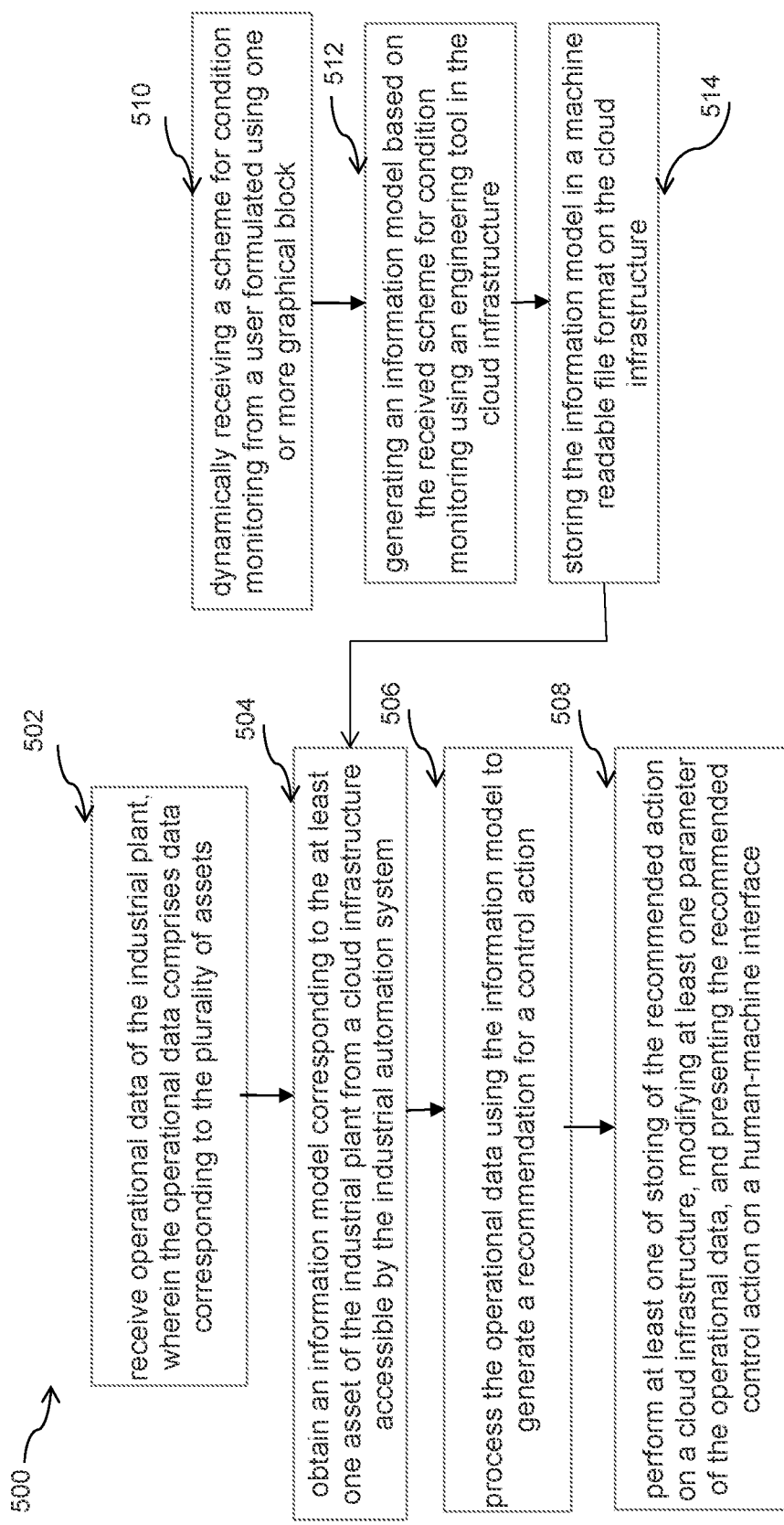
FIG. 5 is a flow chart of a method for condition monitoring in an industrial automation system in accordance with an exemplary embodiment.

FIG. 5 is a flow chart of a method 500 for monitoring an industrial plant in accordance with an exemplary embodiment. The industrial plant monitored by the method 500 includes a plurality of assets and is managed by an industrial automation system. The method 500 is implemented in general by the industrial automation system (of FIG. 2). Specifically, the method is implemented by the condition monitoring unit (numeral 214 of FIG. 2) in association with the authoring unit (numeral 210 of FIG. 2). The method 500 includes receiving operational data of the industrial plant at step 502. The operational data includes data corresponding to the plurality of assets. The operational data comprises data corresponding to the plurality of assets. The method 500 further includes obtaining 504 an information model corresponding to the at least one asset of the industrial plant. The information model is representative of a scheme for monitoring the at least one asset and wherein the information model is authored by an operator. The method 500 also includes processing the operational data using the information model to generate a recommendation usable for preventive maintenance of at least one asset in the industrial plant as illustrated in step 506. The method 500 includes providing the recommendation to a human-machine interface as illustrated in step 508. The step 508 also includes using the recommendation for performing preventive maintenance of at least one asset of the industrial plant. Further, the step 508 also includes storing the recommendations and monitoring variables used to derive the recommendations are stored in the cloud storage.

In one embodiment, the step 504 includes dynamically generating the information model by using an engineering tool hosted on the cloud storage. The engineering tool is accessible either via a gateway server of the industrial plant or directly via an internet communication channel. Specifically, the generating aspect of the step 504 includes generating a library of function models and a library of device type models. Each of the function model is generated by specifying an input, an output, a rule based logic and an end-point. Further, the generating aspect of the step 504 also includes generating a library of information models. In one embodiment, the information model is determined using at least one function model and at least one device type models.

In another embodiment, custom modules are used to generate information models. Specifically, a custom module includes software routines such as, but not limited to, a machine learning technique based software routine or an artificial intelligence technique based software routine. Typically, the custom modules are implemented in specific programming languages such as, but not limited to, python and java. The custom modules are provided with wrapper functions to create remote procedure calls. In one embodiment, a REST (Representational State Transfer) based remote procedure call is used. In an alternate embodiment, a SOAP (Simple Object Access Protocol) based remote procedure call is used. It may be noted herein that any other remote procedure calling method based on client-server architecture and state agnostic approach may also be used. The custom module along with the corresponding remote procedure calls are stored on the cloud storage. Further, a function description for the custom module is created and stored as an information model in the cloud storage. The function description is created by specifying an input, an output and an end-point for the custom module. In one embodiment, the function description is stored in a file using one of a mark-up language such as, but not limited to, XML and YML. In other embodiments, the function description file is stored using JSON (JavaScript Object Notation) format.

In a specific embodiment, the step 504 includes dynamically receiving a new scheme for condition monitoring from a user at step 510. The new scheme is formulated using one or more graphical blocks. The step 504 further includes generating an information model based on the received scheme for condition monitoring using the engineering tool hosted in the cloud infrastructure as illustrated in step 512. The step 504 also includes storing the information model in a machine readable format on the cloud infrastructure as illustrated in step 514. In an alternate embodiment, the steps 510-512 may also be applicable for deploying custom modules remote procedure calls corresponding to the custom modules and the information model representative of the function description for invoking the remote procedure calls in a dynamic manner.

The invention claimed is:

1. A method for condition monitoring of an industrial plant having a plurality of assets using an industrial automation system, the method performed by the industrial automation system, the method comprising:
receiving operational data of the industrial plant, wherein the operational data comprises data corresponding to the plurality of assets,
obtaining an information model corresponding to at least one asset from the plurality of assets of the industrial plant from a cloud infrastructure accessible by the industrial automation system, wherein the information model is representative of a dynamically updated scheme for condition monitoring of the at least one asset and comprises condition monitoring logic for evaluating states and condition of the at least one asset using one or more operational parameters associated with the received operational data;
processing the operational data using the information model to generate a recommendation for a control action, wherein the control action comprises at least one of: storing of the recommended action on the cloud infrastructure, modifying at least one parameter of the operational data, or presenting the recommended control action on a human-machine interface; and wherein the industrial automation system is configured to update the information model by:
dynamically receiving a new scheme for condition monitoring from a user formulated using a plurality of graphical blocks in a user interface, wherein the plurality of graphical blocks includes graphical representations of one or more input parameters, one or more function models, and one or more device type models, wherein the plurality of graphical blocks are interconnected by a plurality of interconnections provided by the user;
generating an updated information model based on the received new scheme for condition monitoring using an engineering tool in the cloud infrastructure; and
storing the updated information model in a machine readable file format on the cloud infrastructure.

2. The method of claim 1, wherein obtaining the information model comprises generating a library of function models, and a library of device type models.

3. The method of claim 2, wherein obtaining the information model comprises generating the information model based on at least one function model from the library of function models and at least one device type model from the library of device type models.

4. The method of claim 2, wherein generating the updated information model comprises authoring a function model by specifying an input, an output, a rule based logic and an end-point.

5. The method of claim 2, wherein generating the updated information model comprises storing a custom module with a corresponding remote procedure call.

6. The method of claim 5, wherein generating the updated information model comprises specifying an input, an output and an end-point for the custom module.

7. The method of claim 5, wherein obtaining the information model comprises receiving the custom module from an infrastructure storage.

8. The method of claim 2, wherein generating the updated information model comprises storing the updated information model using a mark-up language on a cloud infrastructure as a model file.

9. The method of claim 8, wherein obtaining the information model comprises retrieving the model file from the cloud infrastructure.

10. An industrial automation system for condition monitoring of an industrial plant having a plurality of assets using an industrial automation system, the industrial automation system comprising:
a data acquisition unit configured to receive operational data of the industrial plant, wherein the operational data comprises data corresponding to the plurality of assets;
a database unit communicatively coupled to the data acquisition unit and configured to store the operational data;
an authoring unit communicatively coupled to the database unit and configured to generate an information model by:
dynamically receiving a scheme for condition monitoring from a user formulated using a plurality of graphical blocks in a user interface, wherein the plurality of graphical blocks includes graphical representations of one or more input parameters, one or more function models, and one or more device type models, wherein the plurality of graphical blocks are interconnected by a plurality of interconnections provided by the user;
generating an information model based on the received scheme for condition monitoring using an engineering tool in a cloud infrastructure wherein the information model is representative of a dynamically received scheme for condition monitoring of the at least one asset and comprises condition monitoring logic for evaluating the states and condition of the at least one asset using one or more operational parameters associated with the received operational data; and
storing the information model in a machine readable file format on the cloud infrastructure; and
a condition monitoring unit communicatively coupled to the authoring unit and the cloud infrastructure and configured to process the operational data using the information model to generate a recommendation for a control action, wherein the control action comprises at least one of a storing of the recommended action on the cloud infrastructure, modifying at least one parameter of the operational data, and presenting the recommended control action on a human-machine interface.

11. The industrial automation system of claim 10, wherein the authoring unit is configured to:
access an engineering tool hosted on the cloud infrastructure via the internet;
generate a library of function models and a library of device type models using the engineering tool; and
store the library of function models and the library of device type models on the cloud infrastructure using the engineering tool.

12. The industrial automation system of claim 11, wherein the authoring unit is configured to:
author the information model based on at least one function model among the library of function models and at least one device type model from the library of device type models using the engineering tool; and
store the authored information model on the cloud infrastructure using the engineering tool.

13. The industrial automation system of claim 10, wherein the authoring unit is configured to:
- store a custom module with a corresponding remote procedure call using the engineering tool of the cloud infrastructure; and
- author an information model corresponding to the custom module by specifying an input, an output, and an end-point for the custom module using the engineering tool.

14. The industrial automation system of claim 13, wherein the condition monitoring unit is configured to:
- receive the information model and the custom module from the cloud infrastructure using deployment tool of the cloud infrastructure; and
- process the operational data using the information model and the custom module to generate the recommendation.

15. The industrial automation system of claim 13, wherein the authoring unit is configured to store the information model in a mark-up file format using the engineering tool of the cloud infrastructure.

16. The industrial automation system of claim 13, wherein the authoring unit is configured to use representational state transfer application interfaces for implementing the remote procedure call.

* * * * *